United States Patent
Benedetti (10) Patent No.: US 11,213,858 B2
(45) Date of Patent: Jan. 4, 2022

(54) SYSTEM FOR PROCESSING FRUIT OR VEGETABLE PRODUCTS OF THE TYPE OF BLUEBERRIES AND THE LIKE

(71) Applicant: UNITEC S.P.A., Lugo (IT)

(72) Inventor: Luca Benedetti, Ravenna (IT)

(73) Assignee: UNITEC S.P.A., Lugo (IT)

( * ) Notice: Subject to any disclaimer, the term of this patent is extended or adjusted under 35 U.S.C. 154(b) by 767 days.

(21) Appl. No.: 16/071,433

(22) PCT Filed: Jan. 19, 2017

(86) PCT No.: PCT/IB2017/050281
§ 371 (c)(1),
(2) Date: Jul. 19, 2018

(87) PCT Pub. No.: WO2017/125872
PCT Pub. Date: Jul. 27, 2017

(65) Prior Publication Data
US 2021/0205854 A1    Jul. 8, 2021

(30) Foreign Application Priority Data

Jan. 20, 2016 (IT) .................... IT102016000004980

(51) Int. Cl.
*B07C 5/10* (2006.01)
*A23N 15/00* (2006.01)
(Continued)

(52) U.S. Cl.
CPC ............ *B07C 5/10* (2013.01); *A23N 15/00* (2013.01); *B65G 21/10* (2013.01); *B65G 41/008* (2013.01);
(Continued)

(58) Field of Classification Search
CPC ..... B07C 5/10; B07C 2501/009; A23N 15/00; A23N 2015/008; B65G 47/268;
(Continued)

(56) References Cited

U.S. PATENT DOCUMENTS 4,106,628 A    8/1978  Warkentin et al.
4,116,339 A *  9/1978  Holmes ................. B07B 13/003
                                                     209/699
(Continued)

FOREIGN PATENT DOCUMENTS

CL    2018001945 A1    11/2018
JP       61103591 A     5/1986
(Continued)

OTHER PUBLICATIONS

International Search Report dated May 12, 2017 re: Application No. PCT/IB2017/050281, pp. 1-4, citing: JP S61 103591 A, JP 2005 177595 A, US 2013/334109 A1, US 2004/163929 A1, US 4 106 628 A, JP 2001 009383 A, JP H06 154711 A, US 2003/201211 A1, KR 2005 0000745 A, US 4 611 704 A and JP 2010 047404 A.
(Continued)

*Primary Examiner* — Mark A Deuble
(74) *Attorney, Agent, or Firm* — Cantor Colburn LLP (57) ABSTRACT

A system for processing fruit or vegetable products of the type of blueberries and the like, includes a first unit, in its turn having in series at least one loading station, at least one pre-sizing station, at least one pre-selection station and at least one first alignment station. The system further includes a second unit, in its turn having in series at least one second alignment station, at least one optical sizing station and at least one distribution station. Each of the first unit and the second unit has dimensions and space occupation compatible with its accommodation and transport in a single container.

9 Claims, 7 Drawing Sheets

(51) Int. Cl.
  *B65G 21/10* (2006.01)
  *B65G 41/00* (2006.01)
  *B65G 47/26* (2006.01)
(52) U.S. Cl.
  CPC ...... *B65G 47/268* (2013.01); *A23N 2015/008* (2013.01); *B07C 2501/009* (2013.01); *B65G 2201/0211* (2013.01); *B65G 2207/28* (2013.01)
(58) Field of Classification Search
  CPC ............... B65G 21/10; B65G 41/008; B65G 2201/0211; B65G 2207/28
  See application file for complete search history.

(56) References Cited

U.S. PATENT DOCUMENTS

| | | | |
|---|---|---|---|
| 4,611,704 | A | 9/1986 | Burgess, Jr. |
| 8,757,054 | B2 * | 6/2014 | Benedetti ............... A23N 15/02 99/638 |
| 2003/0201211 | A1 | 10/2003 | Bennett et al. |
| 2004/0163929 | A1 | 8/2004 | Mills |
| 2013/0313169 | A1 * | 11/2013 | Lapeyre ................ B07C 5/00 209/546 |
| 2013/0334109 | A1 | 12/2013 | Liedl |
| 2015/0027935 | A1 * | 1/2015 | Palmbos ................ B07B 1/14 209/668 |
| 2015/0157034 | A1 * | 6/2015 | McEntire, Jr. ......... B26D 7/088 426/335 |
| 2019/0152710 | A1 * | 5/2019 | Reed ..................... B65G 15/58 |

FOREIGN PATENT DOCUMENTS

| | | |
|---|---|---|
| JP | 06154711 A | 6/1994 |
| JP | 2001009383 A | 1/2001 |
| JP | 2005177595 A | 7/2005 |
| JP | 2010047404 A | 3/2010 |
| KR | 20050000745 A | 1/2005 |
| WO | 2017125873 A1 | 7/2017 |

OTHER PUBLICATIONS

Written Opinion dated May 12, 2017 re: Application No. PCT/IB2017/050281, pp. 1-4, citing: JP S61 103591 A, JP 2005 177595 A, US 2013/334109 A1, US 2004/163929 A1, US 4 106 628 A, JP 2001 009383 A, JP H06 154711 A, US 2003/201211 A1, KR 2005 0000745 A, US 4 611 704 A and JP 2010 047404 A.

* cited by examiner

SYSTEM FOR PROCESSING FRUIT OR VEGETABLE PRODUCTS OF THE TYPE OF BLUEBERRIES AND THE LIKE

TECHNICAL FIELD

The present disclosure relates to a system for processing fruit or vegetable products of the type of blueberries and the like.

BACKGROUND

The conventional process of automation of production activities involves an ever-increasing number of industrial sectors, which cannot avoid the necessity to meet growing demand yet at competitive prices, and therefore have to devote the utmost attention to keeping down costs.

Such twofold objective is achievable in fact, by using systems and automated lines for all the activities that are first necessary in order to transform the raw materials and the semi-finished products into finished products, and subsequently to package them in the suitable formats, in order to thus make them available to the distributors and finally to the target customer.

The food industry is also in the position described above: the demand for fruit and vegetable products is increasingly often met by large companies, which equip themselves with large-scale systems that are at least partially automated, and capable of moving, checking and/or packaging a high number of products of interest in the unit of time, limiting the role of the operator to a simple supervision of the process.

Usually, such systems are fed with indiscriminate masses of product, often originating in the raw state straight from the fields and therefore still extremely heterogeneous in terms of quality, size, defects, level of dirt or impurities present, etc.

Therefore, the systems used for treatment and finally for packaging are further complicated, for example, by numerous stations for vision, control and sizing Such stations are in fact capable of recognizing and classifying the products as a function of one or more preset parameters (color, size, shape, sugar content, level of defects, etc.), so as to subsequently divide them (into homogeneous groups) and send them downstream to different stations and/or for different packagings.

Such implementation solutions are not devoid of drawbacks, however.

In fact it appears evident that such complexity inevitably translates to the necessity to provide systems that are particularly sophisticated and massive, in terms of dimensions, the installation and activation of which evidently poses not a few problems for the companies that build them as well those that buy them, and who are to use the system.

In more detail, one problem that it is not easy to resolve is already represented by the transportation of the system from the place of construction to the place of installation: the complexity and the dimensions require the maker companies to make great efforts, and involve a great number of means of transport and containers, with high costs that inevitably have a negative and most unwelcome effect on the overall costs and on the profitability of the sale of the system, and of the system itself.

It should be noted however that often the demand for such systems comes from companies that operate in the food sector, and which are located in the farthest-flung corners of the globe: for the maker company, the opportunity to satisfy such a request clashes very undesirably with the practical difficulties of transporting to the installation location the various parts that will need to make up the system.

The context described above is even more aggravated if one observes first of all that often the requirement is to be able to rely on systems that are in any case capable of ensuring increasingly high productivity, which imposes even greater structural complexity and more cumbersome supporting apparatuses.

This is even more evident when the installation and activation is required of systems intended for the treatment of some fruits that present further and problematic peculiarities, such as blueberries. In fact, as is known such fruit is very delicate, and therefore it requires great care in its handling in order to prevent any impact or damage. In addition, it is a substantially prized fruit, owing to its low availability in nature which contrasts with its high approval by customers.

The contrivances necessary for the correct treatment of blueberries determines additional structural complexity (and, sometimes, the impossibility of making adequate systems) and, indeed, further difficulties with transport and installation.

SUMMARY

The aim of the present disclosure is to solve the above mentioned problems, by providing a system that is capable of effectively processing blueberries and similar fruit and vegetable products and which can be easily transported to the location of installation and use.

Within this aim, the disclosure provides a system that can be easily mounted and installed, once it has been transported to the desired location.

The disclosure also provides a system that is easily transportable and installable, while at the same time ensuring high productivity and high performance levels in general.

The disclosure further provides a system that ensures a high reliability of operation.

The disclosure provides a system that adopts an alternative technical and structural architecture to those of conventional systems.

The disclosure further provides a system that can be easily implemented using elements and materials that are readily available on the market.

The disclosure also provides a system that is low cost and safely applied.

This aim and these and other advantages which will become better apparent hereinafter are achieved by providing a system for processing fruit or vegetable products of the type of blueberries and the like, characterized in that it comprises a first unit, which comprises in series at least one loading station, at least one pre-sizing station, at least one pre-selection station and at least one first alignment station, and a second unit, which comprises in series at least one second alignment station, at least one optical sizing station and at least one distribution station, each one of said units having dimensions and space occupation compatible with its accommodation and transport in a single container.

BRIEF DESCRIPTION OF THE DRAWINGS

Further characteristics and advantages of the disclosure will become better apparent from the detailed description that follows of a preferred, but not exclusive, embodiment of the system according to the disclosure, which is illustrated by way of non-limiting example in the accompanying drawings, wherein.

DETAILED DESCRIPTION OF THE DRAWINGS

With particular reference to FIGS. 1-6, the reference numeral 1 generally designates a system for processing fruit or vegetable products of the type of blueberries and the like.

In more detail, it should be noted from this point onward that in the preferred application of the disclosure, to which reference will frequently be made in the present discussion, the fruit or vegetable products are in fact blueberries, which with their peculiarities pose problems that are not easy to resolve for the companies that make automated systems of the type of the system 1, but which are effectively resolved, as will be seen, with the adoption of the latter.

In any case, it should be emphasized that the system 1 according to the disclosure can be intended for the movement, the sizing, the checking and/or the packaging of other fruits or fruit or vegetable products in general. Therefore, in the following pages, every specific reference to blueberries should be understood as being extended to any similar fruit or vegetable product, where the specific requirements and/or applicative restrictions allow it.

Figure 1:
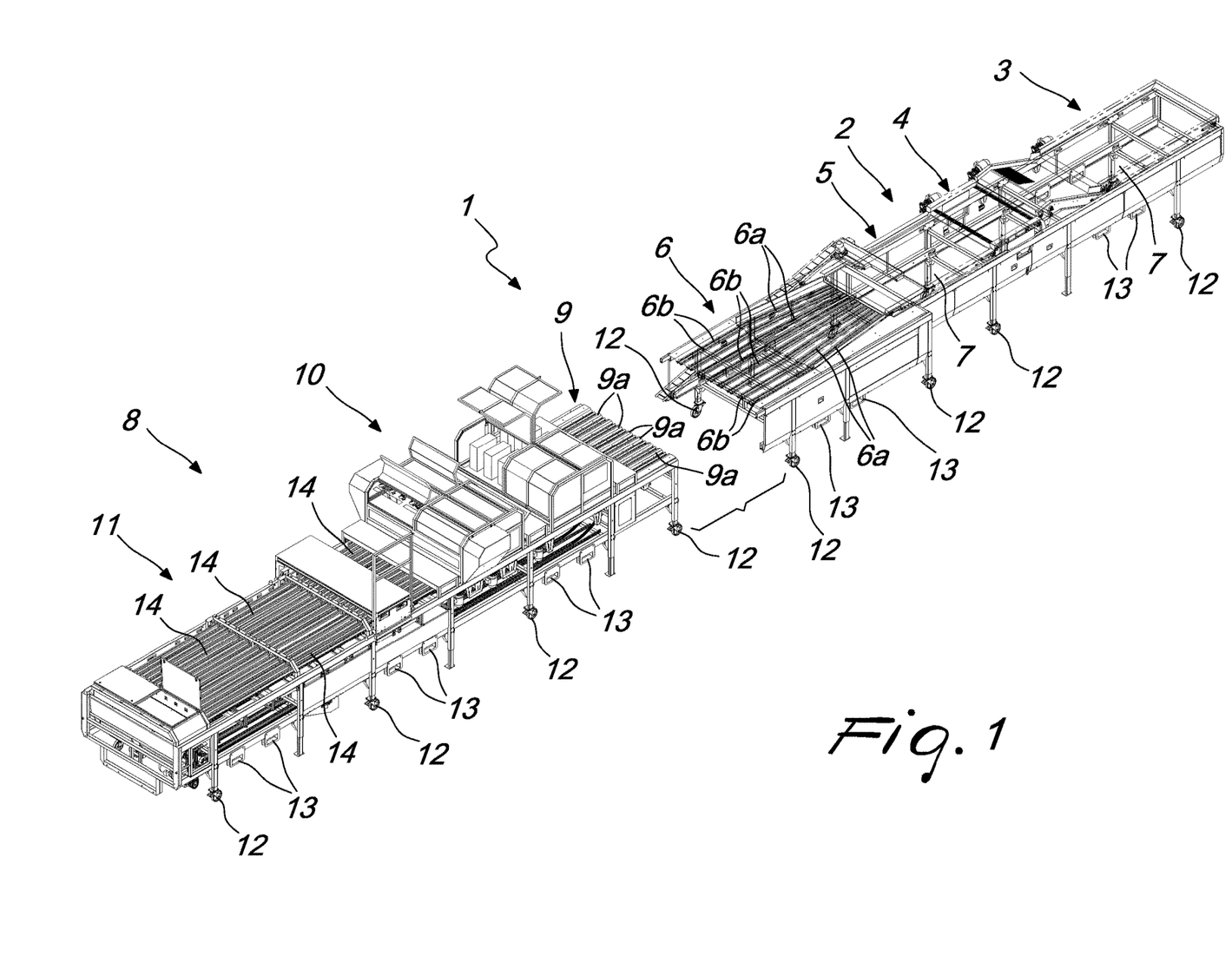
FIG. 1 is a perspective view of the system according to the disclosure.
Figure 1A:
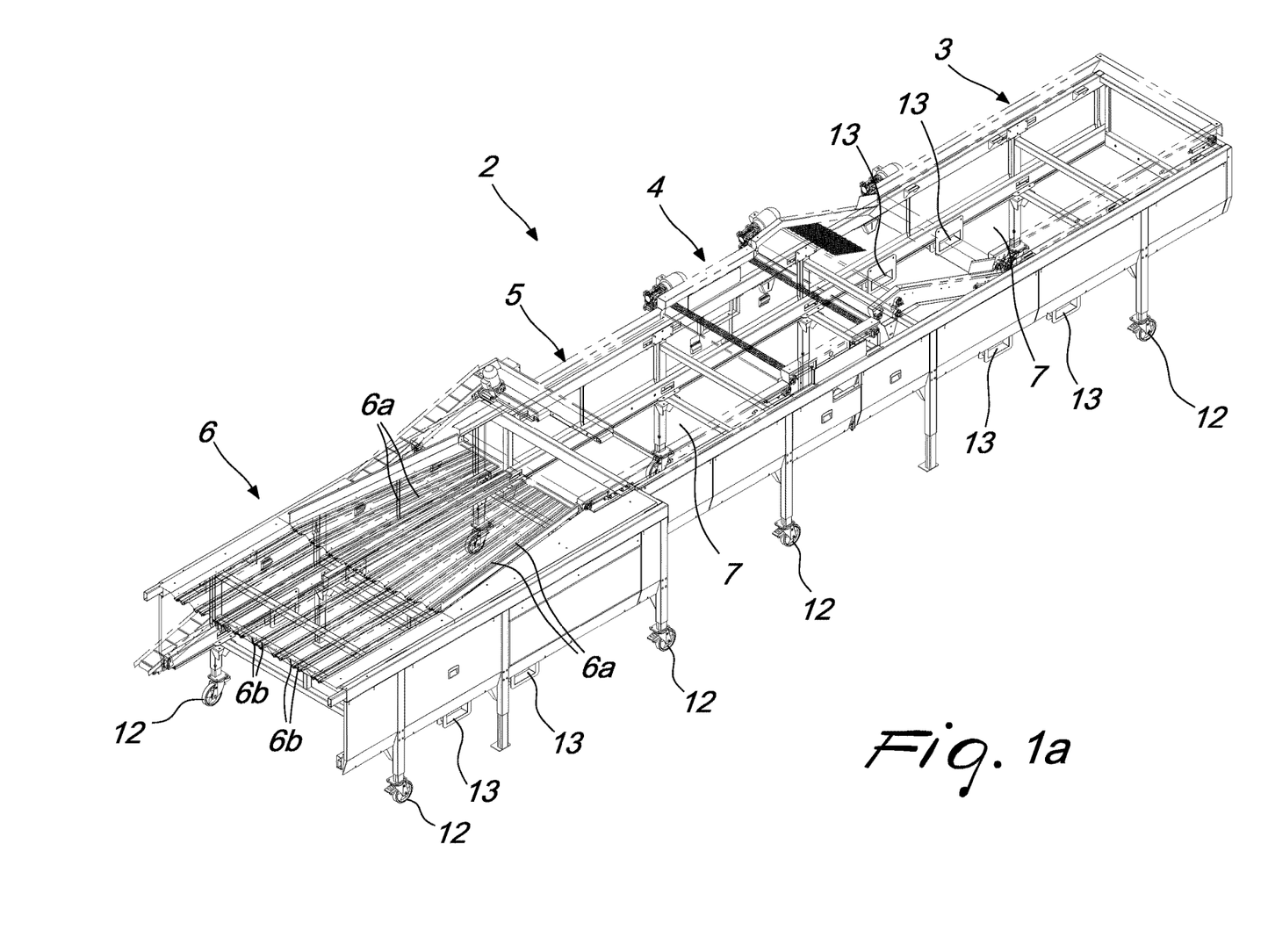
FIG. 1a is a perspective view of a first unit.

According to the disclosure, the system 1 comprises first of all a first unit 2, which in series comprises in its turn at least one loading station 3, at least one pre-sizing station 4, at least one pre-selection station 5 and at least one first alignment station 6.

In more detail, in the loading station 3 the blueberries can be loaded onto the system 1, for example by way of simple manual action of the operators or by way of special supporting instruments, which are able for example to automatically overturn on a designated area the contents of cases or other containers, which have been filled indiscriminately with the products (blueberries or the like) to be processed along the system 1.

It should be noted that from the loading station 3, the mass of blueberries is usually (but not necessarily) conveyed toward the subsequent sections by way of one or more carpet conveyor belts 7 (which can be conventional).

After the loading station 3 therefore, the blueberries are forced to pass through the pre-sizing station 4 which mechanically applies a preliminary sizing of the mass in motion. For example, to this end the pre-sizing station 4 can comprise traps of the type of ducts of defined width, which allow only products larger than a preset value to pass through, and make the others, which will not continue the treatment, fall into special containers.

Subsequently, the pre-selection station 5 has an area in which the blueberries, made to advance by a conveyor belt 7, are subjected to checking by operators, who can select the blueberries in transit and remove the ones that evidently do not meet the desired quality criteria (for example because they are clearly flawed or rotten).

Likewise, the action of the operators in the pre-selection station 5 makes it possible to remove any debris or macro-impurities (originally contained in the cases from which the blueberries were taken), which otherwise could cause malfunctions or stoppages in the subsequent sections (or in any case compromise the correct operation of the system 1).

The first station 6 makes it possible (as will be seen, with the aid of subsequent apparatuses) to align the blueberries, so as to supply them downstream in ordered rows.

Figure 1B:
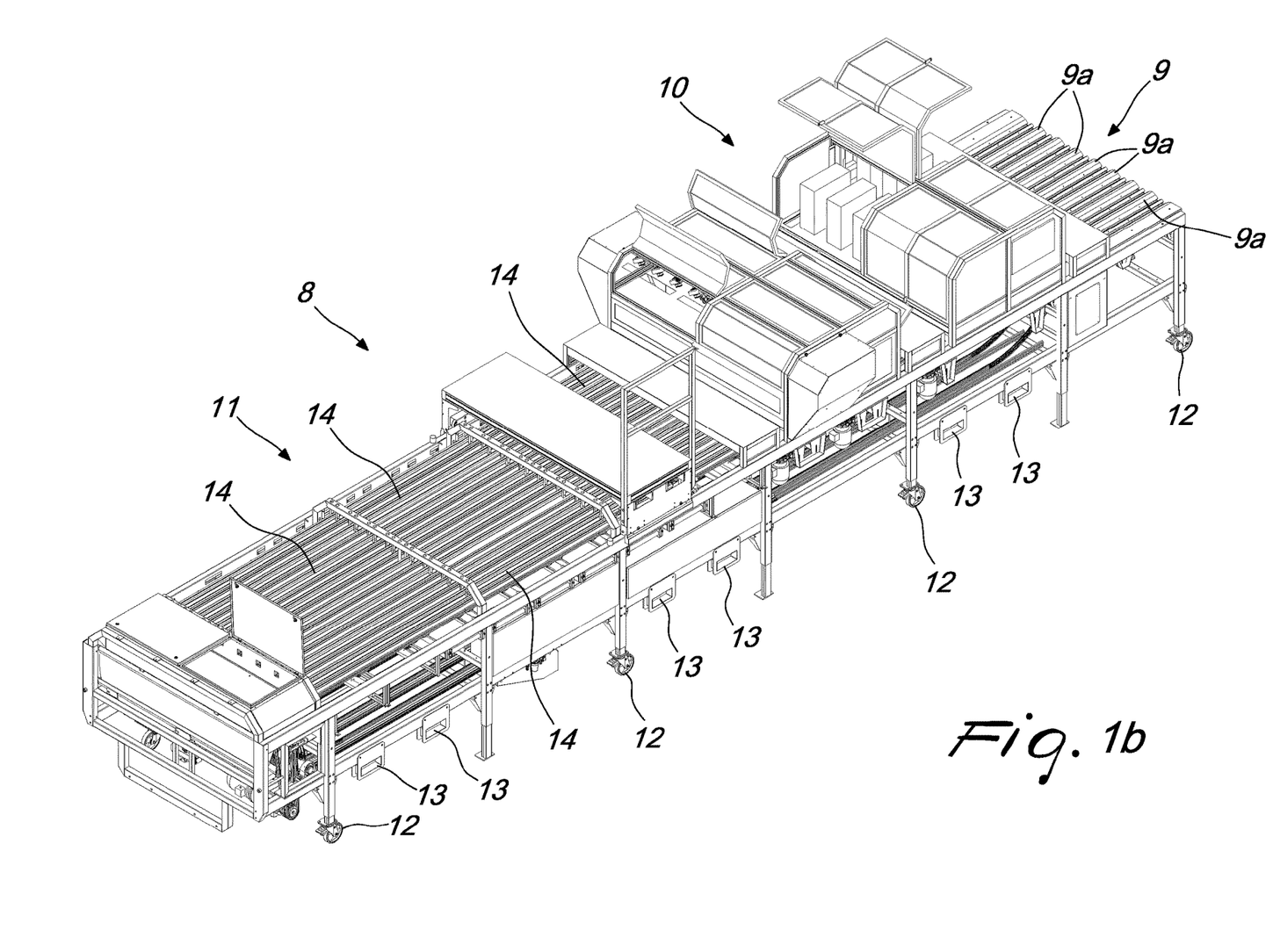
FIG. 1b is a perspective view of a second unit.
Figure 2:
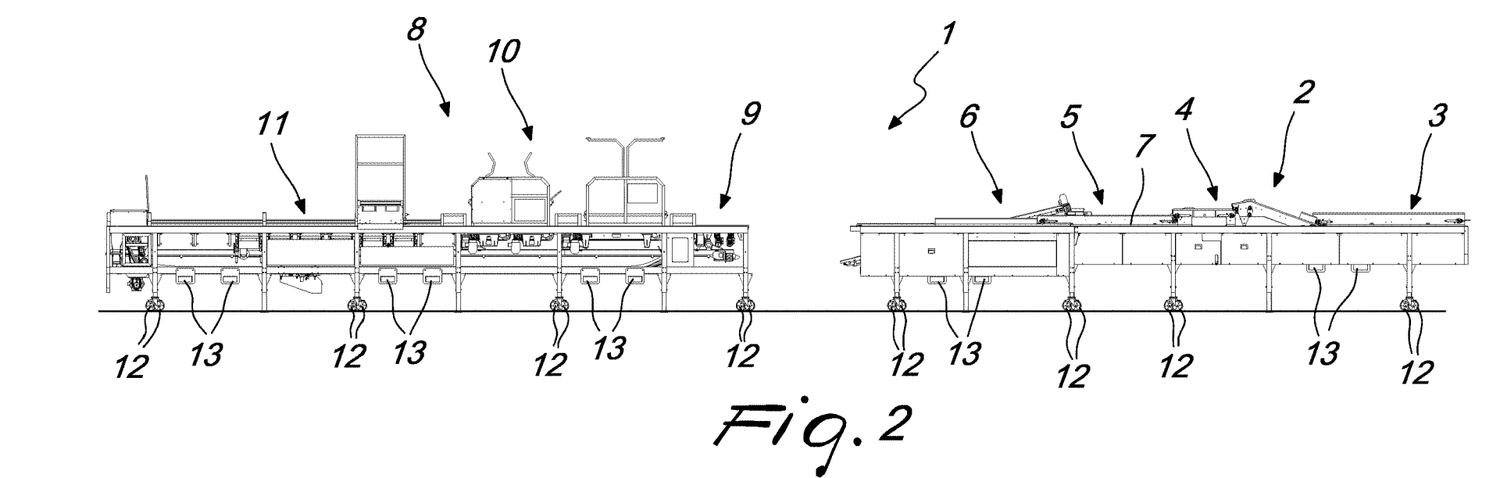
FIG. 2 is a side view of the system according to the disclosure.
Figure 3:
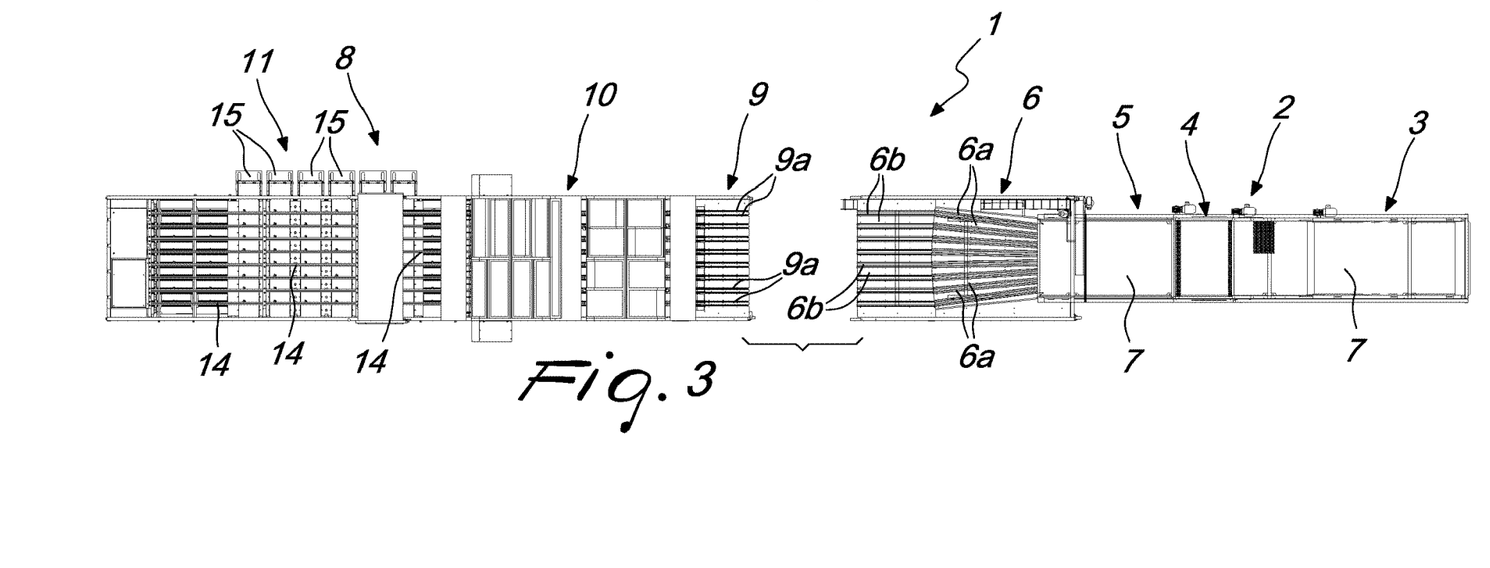
FIG. 3 is a view from above of the system according to the disclosure.
Figure 4:
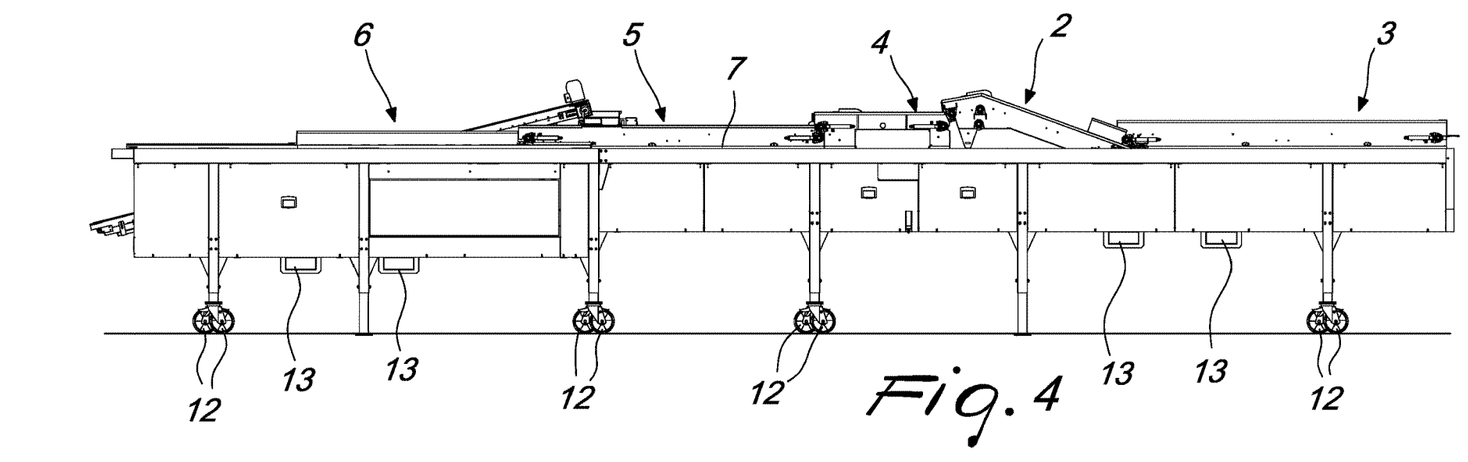
FIG. 4 is a side view of the first unit.
Figure 4A:
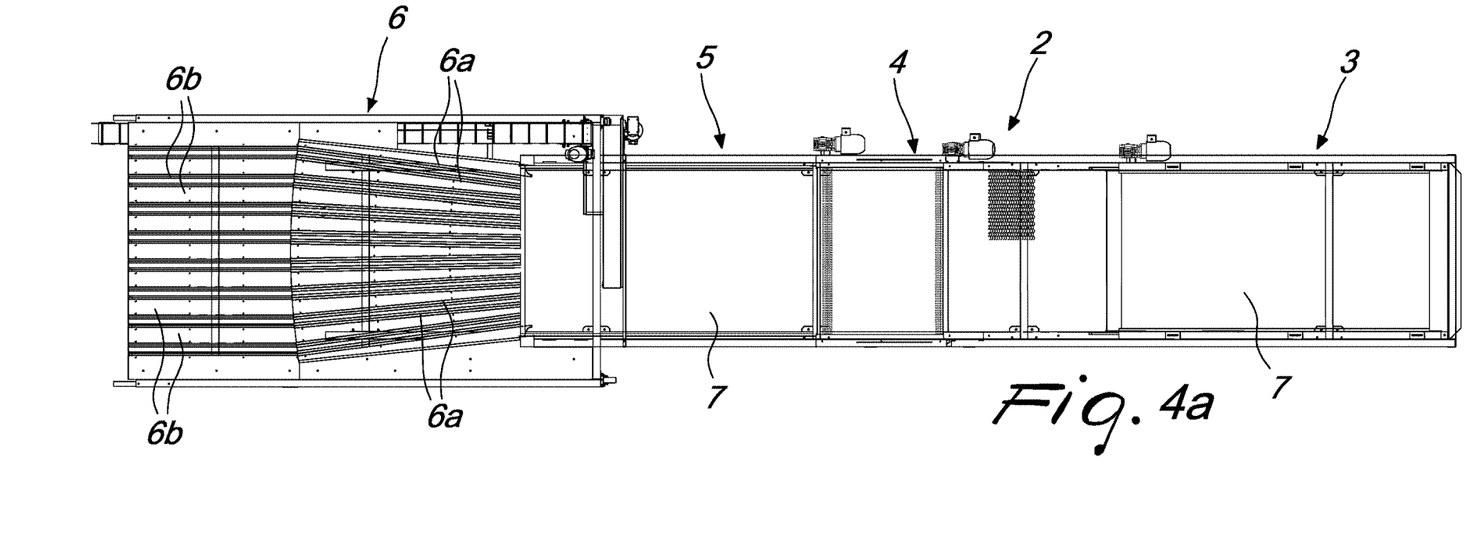
FIG. 4a is a view from above of the first unit.
Figure 5:
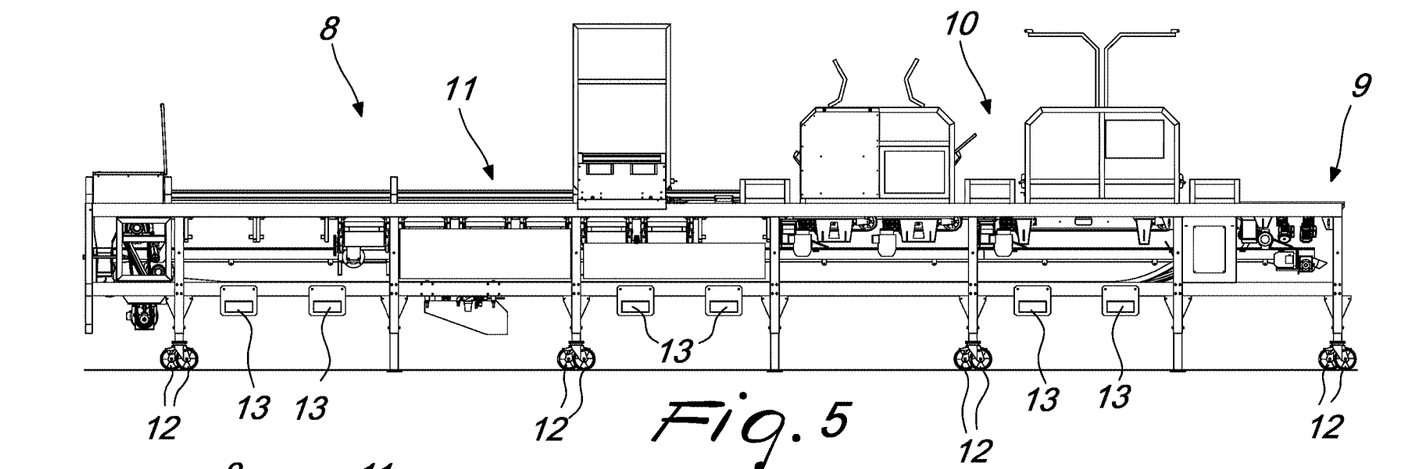
FIG. 5 is a side view of the second unit.
Figure 5A:
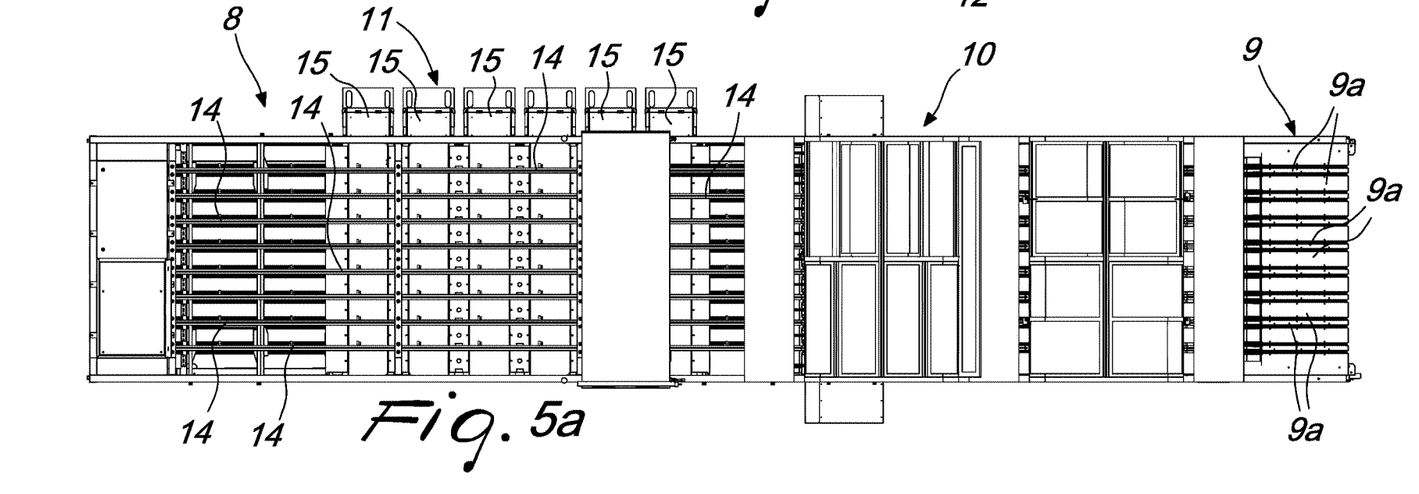
FIG. 5a is a view from above of the second unit.
Figure 6:
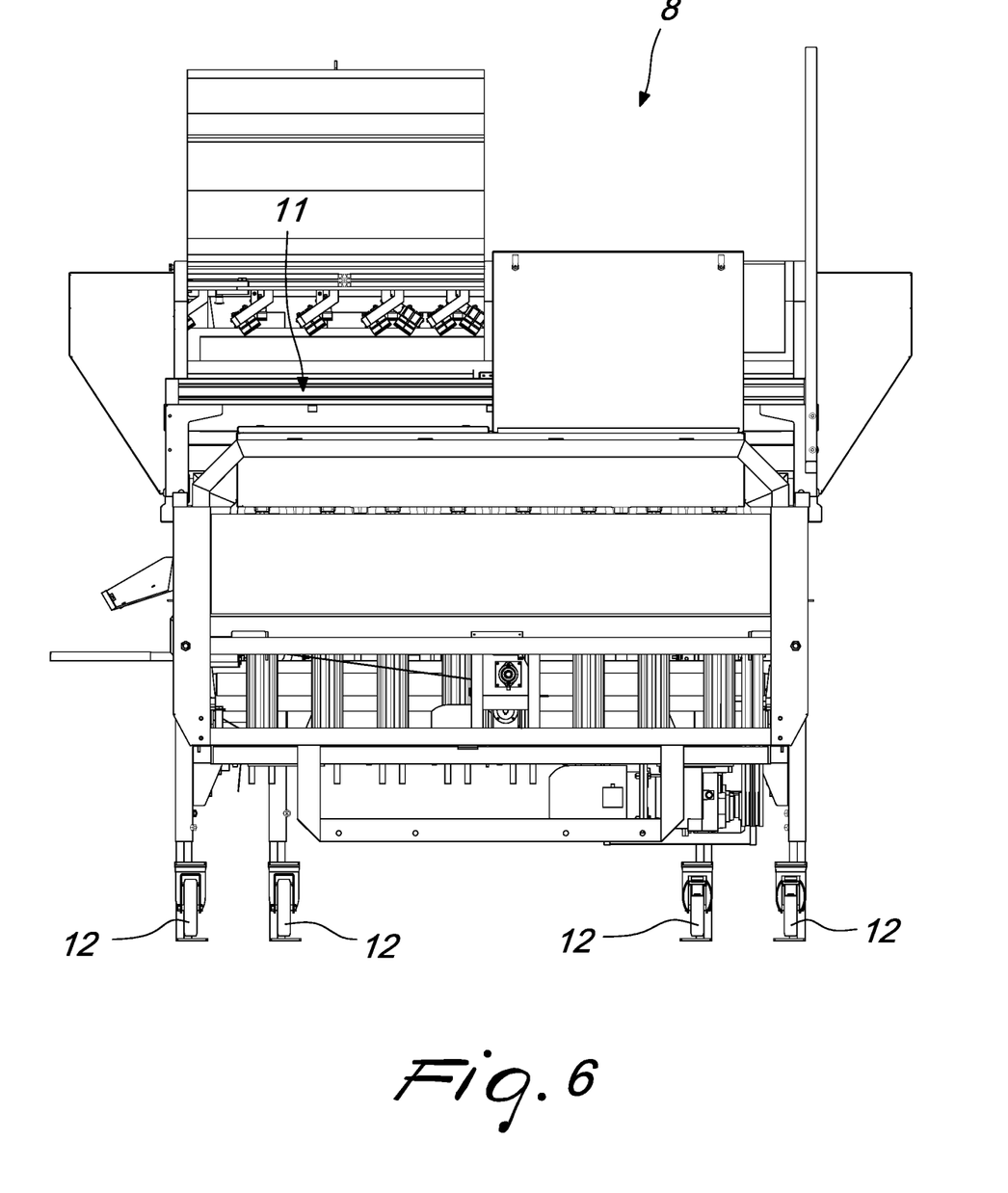
FIG. 6 is a front elevation view of the second unit.

The system 1 comprises therefore also a second unit 8, which in turn comprises in series at least one second alignment station 9, at least one optical sizing station 10 and at least one distribution station 11.

The second alignment station 9 continues and completes the work of the first station 6, delivering the blueberries to the sections downstream in one or more aligned rows, with each row presenting the blueberries arranged one by one.

The blueberries are then subjected to checks performed by video cameras or other optical vision systems, comprised in the optical sizing station 10, which are capable of identifying for each blueberry the value assumed from preset reference parameters (color, size category, shape, sugar content, level of external and/or internal flaws, etc.).

Precisely on the basis of the values detected by the sizing system 10 therefore, the distribution station 11 is capable of sending each blueberry to a respective container, which is thus filled by products that are homogeneous and ready for packaging or in any case for the next steps of the production/logistics process.

Precisely in order to ensure the desired compactness and practicality of transport therefore, each unit 2, 8 has dimensions and space occupation compatible with its accommodation and transport in a single container.

In this regard, it should be noted that in the known art (and in the present discussion) the term "container" identifies a large case, in general made of metal and usually hermetically sealed, parallelepiped in shape and with internationally-standardized measurements.

The dimensions and the encumbrances of the units 2, 8 are indeed chosen as a function of the standardized measurements of the container: each unit 2, 8 can thus be effectively accommodated (and transported) in a single container and two of these will be sufficient to transfer the entire system 1 (from the place of production to the place of use), thus achieving the set aim.

In particular, the first alignment station 6 and the second alignment station 9 comprise quick mutual coupling means, which can be selectively actuated during installation of the units 2, 8 proper (in the place where the system 1 is intended to operate) following their juxtaposition, i.e. when, in anticipation of the activation of the system 1, the units 2, 8 are aligned and brought into contact at the first station 6 and at the second station 9.

More specifically, such means comprise brackets and pins, which make it possible in a practical and quick manner to couple the first alignment station 6 with the second alignment station 9, effectively restoring the definitive configuration of the system 1.

Preferably in fact, each unit 2, 8 (and the system 1 in the final configuration) will have already been tested in the place of construction (by the maker), in order to then be separated into the two units 2, 8 for transportation in two containers and then be reassembled once again (by simply acting on the quick coupling means) in the place of use (at the premises of the purchasing company).

In an embodiment of significant practical interest, cited by way of non-limiting illustration of the application of the disclosure, the first alignment station 6 comprises at least one pair of first belts 6a which can move and are arranged to form a V, with a first preset center distance. Preferably, the first alignment station 6 comprises a plurality of pairs of first belts 6a which are arranged mutually side by side in order to increase the productivity (as in the example m the accompanying figures).

Likewise, the second alignment station 9 comprises at least one pair (and, again, preferably several parallel pairs) of second belts 9a that can also move and are arranged to form a V, but with a second preset center distance, shorter than the first center distance.

When the two units 2, 8 are reunited therefore, the blueberries are forced to pass through in series the interspace comprised between a pair of first belts 6a and the interspace (aligned with the previous one) comprised between a respective pair of second belts 9a. When the blueberries, pushed toward the first station 6 by the conveyor belt, are at the mouth of the interspaces, the mechanical action of the first belts 6a and of the second belts 9a (in motion) automatically and progressively brings them into alignment, even when they enter the interspaces in an adjacent and not aligned configuration. In this sense, precisely the choice to use at least one first pair and at least one second pair arranged in series, in fact enables a progressive alignment in order to ensure the desired result gradually (and therefore avoiding excessive stresses for the blueberries and/or any clogging).

The gradual nature of the alignment (and therefore the maximum efficacy, with the lowest risk of damage to the blueberries), is best obtained in a preferred embodiment of the system 1 (illustrated in the accompanying figures), in which the first alignment station 6 also comprises at least one pair (and preferably a plurality of parallel pairs) of intermediate belts 6b. The intermediate belts 6b can also move and are arranged to form a V, downstream of the first belts 6a, and they have a preset intermediate center distance, shorter than the first center distance and longer than the second center distance.

Effectively that is to say, the blueberries are forced to go through three interspaces of progressively decreasing width, thus presenting themselves, downstream of the second station 9, perfectly aligned on one or more rows (one for each triplet of pairs of first belts 6a, intermediate belts 6b and second belts 9a).

Advantageously, in order to further increase the practicality of mounting and transport (for example for the placement inside the container or for its subsequent unloading and positioning in the operational area), each unit 2, 8 is mounted on wheels 12, which thus make it possible to move it in a facilitated manner.

Furthermore, and again with the advantage of ensuring a facilitated movement (for small-scale movements), the framework of each unit 2, 8 has openings 13 for receiving the forks of a forklift truck.

As has already been seen, in the first unit 2 the blueberries are entrained in motion by at least one conveyor belt 7: such first unit 2 comprises therefore a first movement apparatus for the respective conveyor belt 7 (or for each conveyor belt 7).

In turn, the second unit 8 comprises a second movement apparatus for a unit for the discrete conveyance (which can be conventional) of the fruit or vegetable products along at least one advancement line 14, located downstream of the second alignment station 9.

It has already been pointed out that downstream of the second alignment station 9 the blueberries are aligned: each one of them is made to advance discretely, spaced apart from the adjacent products, so as to allow the carrying out of targeted checks and the consequent appropriate treatment, as a function of the outcome of those checks, performed by the optical sizing station 10.

In fact, the advancement line 14 (and, usually, the plurality of mutually parallel advancement lines 14, as in the solution in the accompanying figures), is affected by the optical sizing station 10 and by the distribution station 11 (which necessitate discrete conveyance of the blueberries).

Each movement apparatus comprises preferably at least one drive unit (an electric motor for example), a chain, which is stably associated with the drive unit (i.e. made to move by the latter) and a respective tensioner: such components are advantageously accommodated within the framework of the respective unit 2, 8 and therefore do not compromise its compactness and transportability.

Moreover, it should be noted that the respective electrical/electronic switchboards will also be integrated in the respective units 2, 8.

In an embodiment of significant practical interest, which does not limit the application of the disclosure, the practical methods with which the system 1 performs the final division of the blueberries as a function of the values of the preset parameters assumed by each one of them entail that the distribution station 11 comprises a plurality of nozzles adapted to deliver a compressed air jet (which is directed toward a corresponding portion of an advancement line 14).

Indeed, as a function of the values detected upstream by the instruments of the optical sizing station 10, each nozzle can be actuated on command for the controlled fall of each fruit or vegetable product onto a corresponding underlying evacuation belt 15, which is contained within the space occupation of the second unit 8 in at least one compact arrangement, for transport.

The control and management unit that oversees and commands the activity of the nozzles (as a function of the readings of the video cameras) actuates a respective nozzle when a blueberry passes in front of it which falls within a defined range of values of the preset parameter or parameters (for example when the blueberry is smaller than a certain size category or has a certain shade of color). Thus, by connecting each evacuation belt 15 (which in some embodiments will be telescopic, and therefore at least partially extendable outside the second unit 8) with a respective collection reservoir (a simple case for example), it is possible to accumulate in the latter masses of homogeneous blueberries (as a function of the preset parameters).

Again therefore, by keeping the evacuation belts 15 within the structure of the second unit 8, at least in the compact arrangement, the compactness and practical operation of the second unit 8 and of the system 1 in general are ensured.

It should likewise be noted that the evacuation belts 15 are preferably arranged at a height that is such as to only require the blueberries to endure a minimal drop (from the advancement lines 14), thus guarding against the risk of damage during the falling step.

Conveniently, the system 1 comprises at least one service platform, which can be used by staff assigned to operation and/or maintenance and/or checking the fruit or vegetable products (for example for the selection activities described previously).

Precisely in order to meet the criteria of transportability and compactness mentioned previously, the platform is articulated to the framework of a respective unit 2, 8, so as to be capable of transiting at will from a first configuration to a second configuration, and vice versa.

In the first active configuration, the platform is suitably arranged (proximate to the area to be inspected and optionally protruding externally from the space occupation of the respective unit 2, 8), in order to allow the staff to carry out the necessary activities.

By contrast, in the second configuration of compact transportation (which is in fact obtainable by virtue of the choice to articulate the platform to the framework), the platform is pivoted to within the space occupation of the respective unit 2, 8, so as to keep to the size criteria that make it possible to transport it in the container.

Conveniently, at least one of the units 2, 8 also comprises an uninterruptible power supply (also known with the acronym "UPS"), in order to ensure an electric power supply to the system 1 even in the event of interruption of the electric power supply from the selected primary source (typically, constituted by the mains supply).

Operation of the system according to the disclosure is evident from the foregoing description: in fact it has already been shown that the blueberries are subjected to the action of a plurality of contrivances, which cooperate in the execution of a plurality of automated activities on the products, up to determining the delivery thereof downstream in homogeneous groups (and free from impurities and products that are rotten or in any case flawed).

It should be noted that the system 1 of the type described above, in addition to carrying out various functions and operations on blueberries, is capable of reaching high productivity levels, making possible the sizing of thirty-six fruits per second for each advancement line 14: since there can be for example sixteen advancement lines 14 mutually in parallel, it is possible to process and distribute four hundred fruits per second (it is advisable to consider a prudential percentage of 70% capacity).

As has been seen, the system effectively achieves the treatment, the sizing, and the distribution of blueberries, i.e. those fruits which in conventional solutions pose problems that are difficult to resolve.

Such results are usually obtained with conventional systems of massive dimensions, which require a particularly large number of containers to be transported to the workplace, likewise determining excessive costs.

By contrast, as has been amply shown in the foregoing pages, the system 1 ensures such high productivity with a solution that is compact and transportable to any part of the world using only two containers, subsequently allowing practical and rapid modes of final assembly (each unit 2, 8 being already practically ready for activation) and disassembly if necessary.

In practice it has been found that the system according to the disclosure fully achieves the set aim, since the use of a first unit and of a second unit, each one of which has dimensions and space occupation compatible with accommodation and transport in a single container, makes it possible to provide a system that is effectively capable of processing blueberries and similar fruit or vegetable products, and at the same time is easily transported to the location of installation and use.

The disclosure, thus conceived, is susceptible of numerous modifications and variations. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The content of Italian patent application no. 102016000004980 (UB2016A000096), the priority of which is claimed in the present application, is incorporated as a reference.

The invention claimed is:

1. A system for processing fruit or vegetable products, comprises a first unit, which comprises in series at least one loading station, at least one pre-sizing station, at least one pre-selection station and at least one first alignment station, and a second unit, which comprises in series at least one second alignment station, at least one optical sizing station and at least one distribution station, each one of said first unit or said second units having dimensions and space occupation compatible with accommodation and transport in a single container, wherein said first alignment station comprises at least one pair of first belts configured to move and are arranged to form a V, with a first preset center distance, said second alignment station comprising at least one pair of second belts configured to move and are arranged to form a V, with a second preset center distance shorter than said first preset center distance, for the progressive alignment of the fruit or vegetable products pushed toward said first alignment station by at least one respective conveyor belt.

2. The system according to claim 1, wherein said first alignment station and said second alignment station comprise quick mutual coupling means actuated selectively during the installation of said units following their juxtaposition, said means configured to couple said first alignment station with said second alignment station.

3. The system according to claim 1, wherein said first alignment station comprises at least one pair of intermediate belts configured to move and are arranged to form a V, and are located downstream of said pair of first belts and have a preset intermediate center distance shorter than said first preset center distance and greater than said second preset center distance.

4. The system according to claim 1, wherein one of said first and second units is mounted on wheels for its facilitated movement.

5. The system according to claim 1, wherein a framework of each one of said units forms openings for accommodating the forks of a forklift truck for facilitated movement of each one of said units.

6. The system according to claim 5, wherein said first unit comprises a first conveyor belt, said second unit comprises a second conveyor belt for the discrete conveyance of the fruit or vegetable products along at least one advancement line, located downstream of said second alignment station and affected by said optical sizing station and by said distribution station, each one of said conveyor belts comprising at least one drive unit, a chain stably associated with said at least one drive unit, and a respective tensioner, which are accommodated within the framework of the respective first unit or second unit.

7. The system according to claim 1, wherein at least one of said first and second units comprises an uninterruptible power supply, for supplying electric power even in the event of interruption of the electric power supply from a selected primary source.

8. A system for processing fruit or vegetable products, comprises a first unit, which comprises in series at least one loading station, at least one pre-sizing station, at least one pre-selection station and at least one first alignment station, and a second unit, which comprises in series at least one second alignment station, at least one optical sizing station and at least one distribution station, each one of said units having dimensions and space occupation compatible with accommodation and transport in a single container, wherein said distribution station comprises a plurality of nozzles adapted to deliver a compressed air jet, each one of said nozzles being selectively activateable on command for the controlled fall of each fruit or vegetable product onto a corresponding underlying evacuation belt, contained within the space occupation of said second unit in at least one compact arrangement for transport.

9. A system for processing fruit or vegetable products, comprises a first unit, which comprises in series at least one loading station, at least one pre-sizing station, at least one pre-selection station and at least one first alignment station, and a second unit, which comprises in series at least one second alignment station, at least one optical sizing station and at least one distribution station, each one of said units having dimensions and space occupation compatible with accommodation and transport in a single container, wherein a framework of each one of said units forms openings for accommodating the forks of a forklift truck for facilitated movement of each one of said units, further comprising at least one service platform, for staff assigned to operation or maintenance or checking the fruit or vegetable products, said at least one platform being articulated to the framework of a respective unit for transiting from a first configuration to a second configuration, for compact transport, in which it is gathered within the space occupation of the respective said unit, and from the second configuration to the first configuration.

* * * * *